2,759,012

STEREOISOMERS OF CYANO-OCTAHYDRO-NAPHTHALENES

Melvin S. Newman, Columbus, Ohio, and Sambasiva Swaminathan, Mylapore, India, assignors to The Ohio State University Research Foundation, Columbus, Ohio, a corporation of Ohio No Drawing. Application June 17, 1953, Serial No. 362,391

8 Claims. (Cl. 260—464)

This application is in part a continuation of copending application Serial No. 283,865, filed April 23, 1952, now abandoned.

The inventions disclosed in this application relate to new compositions of matter and to methods for their preparation.

One object of the invention is the production of new compositions of matter, viz., the stereoisomers of 1-hydroxy - 1 - cyano - 6 - oxo - 8α - methyl - 1,2,3,4,6,7,8,8α-octahydronaphthalene.

A further object is the provision of new processes for the production of such compositions of matter. Other objects of the invention will be apparent to those skilled in the art to which the invention pertains.

The novel compounds of the present invention are important intermediates in the synthesis of steroids. The compounds of the present invention can be converted to 1 - acetyl - 6 - oxo - 8α - methyl - 3,4,6,7,8,8α - hexahydronaphthalene by dehydrating to produce 1-cyano-6 - oxo - 8α - methyl - 3,4,6,7,8,8α - hexahydronaphthalene and reacting the latter with ethylene glycol to produce the corresponding cyclic ketal which is converted to the desired intermediate, 1-acetyl-6-oxo-8α-methyl-3,4,6,7,8,-8α-hexahydronaphthalene by a Grignard reaction. This important intermediate can be converted to cortisone according to the procedure disclosed by Friedmann et al. [Chem. and Ind., September 15, 1951, pages 777–778]. The compounds of the present invention are also useful as a plant growth regulator.

We have found that we can obtain embodiments of these new compositions of matter (i. e., a mixture of the stereoisomers of 1-hydroxy-1-cyano-6-oxo-8α-methyl-1,2,3,4,6,7,8,8α-octahydronaphthalene) by the following procedures:

As a starting compound, we can use 1,6-dioxo-8α-methyl-1,2,3,4,6,7,8,8α-octahydronaphthalene (U. S. Patent 2,542,223) in solution in liquid hydrogen cyanide. The starting compound has the following general formula:

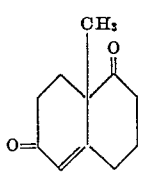

In order to produce the new compound we mix the starting compound with hydrogen cyanide preferably in the presence of a catalyst (such as, for example, a source of cyanide ions) and obtain the above described new compounds. In one desirable embodiment we obtain a solution of the starting compound in liquid hydrogen cyanide and add a solution of potassium cyanide as a source of cyanide ions. Thereupon the new compounds are obtained in solution in excess hydrogen cyanide.

These new compounds have structural formulas

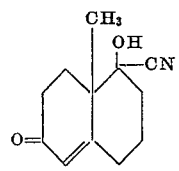

and

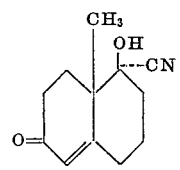

Inasmuch as potassium cyanide is conveniently soluble in water, we usually use an aqueous solution. After obtaining the new compounds in solution, we separate them by suitable methods. We have removed the excess hydrogen cyanide by distillation, cooled and solidified the products, collected them and washed them, and then crystallized the products from ether containing methyl alcohol.

Following is an example of preparation of these new compounds:

Example 1.—1-hydroxy-1-cyano-6-oxo-8α-methyl-1,2,3,-4,6,7,8,8α-octahydronaphthalene

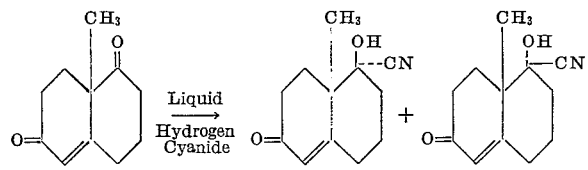

To an ice-cold solution of 1,6-dioxo-8α-methyl-1,2,3-4,6,7,8,8α-octahydronaphthalene (40 g.) in liquid hydrogen cyanide (70 ml.) was added a few drops of an aqueous solution of potassium cyanide and the mixture allowed to stand for ½ hour. At the end of this period, the excess hydrogen cyanide was removed by distillation. The residual liquid, when cooled, solidified. The solid material was collected and washed with water. When crystallized from ether containing methyl alcohol, it melted at 115–125°. The yield is almost quantitative. A recrystallized sample at 115–120 degrees centigrade exhibited the following characteristics:

$\lambda EtOH_{max}$ 244 m$\mu$; $\log_{10} E = 4.13$

Analysis.—Calculated for $C_{12}H_{15}O_2N$: C, 70.2; H, 7.4; N, 6.8. Found: C, 70.4; H, 7.4; N, 6.9.

The product obtained above is a mixture of the stereoisomers. The value of the U. V. absorption maximum and the extinction confirm the presence of the α,β-unsaturated carbonyl system.

It is to be understood that the described embodiments of our invention are for the purpose of illustration and various changes may be made without departing from the scope of our invention.

We claim:

1. A compound selected from the group consisting of α 1-hydroxy - 1 - cyano-6-oxo-8α-methyl-1,2,3,4,6,7,8,8α-octahydronaphthalene and β 1-hydroxy-1-cyano-6-oxo-8α-methyl-1,2,3,4,6,7,8,8α-octahydronaphthalene.

2. A composition of matter consisting of α 1-hydroxy-1 - cyano-6-oxo-8α-methyl-1,2,3,4,6,7,8,8α-octahydronaphthalene.

3. A composition of matter consisting of β 1-hydroxy-1-cyano-6-oxo-8α-methyl-1,2,3,4,6,7,8,8α-octahydronaphthalene.

4. A method of producing a 1-hydroxy-1-cyano-6-oxo-8α-methyl-1,2,3,4,6,7,8,8α-octahydronaphthalene which consists of condensing 1,6-dioxo-8α-methyl-1,2,3,4,6,7,8,8α-octahydronaphthalene with hydrogen cyanide.

5. A method of producing a 1-hydroxy-1-cyano-6-oxo-8α-methyl-1,2,3,4,6,7,8,8α-octahydronaphthalene which comprises mixing ice-cold 1,6-dioxo-8α-methyl-1,2,3,4,6,7,8,8α-octahydronaphthalene with liquid hydrogen cyanide in the presence of cyanide ions.

6. A method of producing a 1-hydroxy-1-cyano-6-oxo-8α-methyl-1,2,3,4,6,7,8,8α-octahydronaphthalene which comprises adding potassium cyanide to a solution of 1,6-dioxo-8α-methyl-1,2,3,4,6,7,8,8α-octahydronaphthalene in liquid hydrogen cyanide.

7. A method of producing a 1-hydroxy-1-cyano-6-oxo-8α-methyl-1,2,3,4,6,7,8,8α-octahydronaphthalene which comprises adding an aqueous solution of potassium cyanide to an ice-cold solution of 1,6-dioxo-8α-methyl-1,2,3,4,6,7,8,8α-octahydronaphthalene in liquid hydrogen cyanide.

8. A method of producing a 1-hydroxy-1-cyano-6-oxo-8α-methyl-1,2,3,4,6,7,8,8α-octahydronaphthalene which comprises adding a small quantity of an aqueous solution of potassium cyanide to an ice-cold solution of 1,6-dioxo-8α-methyl-1,2,3,4,6,7,8,8α-octahydronaphthalene in liquid hydrogen cyanide, allowing the mixture to stand at room temperature for one-half hour; removing excess hydrogen cyanide by distillation; collecting and washing the product; and crystallizing it from ether containing methyl alcohol.

References Cited in the file of this patent

UNITED STATES PATENTS 2,101,823  Dittmar _____ Dec. 7, 1937